United States Patent [19]

Zweegers

[11] Patent Number: 4,525,990
[45] Date of Patent: Jul. 2, 1985

[54] DEVICE FOR MOWING CROP

[76] Inventor: Petrus W. Zweegers, Nieuwendijk 46, Geldrop, Netherlands

[21] Appl. No.: 449,980

[22] Filed: Dec. 13, 1982

[30] Foreign Application Priority Data

Dec. 15, 1981 [NL] Netherlands ............................ 8105634
Apr. 27, 1982 [NL] Netherlands ............................ 8201734
Jul. 6, 1982 [NL] Netherlands ............................ 8202701

[51] Int. Cl.³ .......................................... A01D 55/18
[52] U.S. Cl. ........................................ 56/295; 56/13.6
[58] Field of Search ................... 56/295, 13.6, 192, 6

[56] References Cited

U.S. PATENT DOCUMENTS 2,825,196  3/1958  Gudmandsen .................. 56/13.6
3,014,333  12/1961 Clark, Jr. ............................ 56/295
3,905,182  9/1975  Geier .................................. 56/295
4,283,905  8/1981  Van der Lely ..................... 56/295

FOREIGN PATENT DOCUMENTS 217186   9/1958  Australia ............................... 56/295
2001836  2/1979  United Kingdom ................ 56/295

Primary Examiner—Gene Mancene
Assistant Examiner—David L. Tarnoff
Attorney, Agent, or Firm—Edmund M. Jaskiewicz

[57] ABSTRACT

A device for mowing crop comprising a cutting member to be rotated about an upwardly extending rotary axis and supporting at least one upwardly extending pin located near the outer circumference of the cutting member, said pin being guarded in the cutting member with the aid of a pin-engaging end of a spring, while a cutting knife is freely rotatable about said pin whereby the end of the spring engaging the pin is slidably arranged in a recess in the pin, whereas the end of the spring remote from the pin is guarded against shifting transversely of the longitudinal axis of the pin with the aid of parts of the cutting member at least partly surrounding the end concerned and being loosely in engagement with the spring.

14 Claims, 10 Drawing Figures

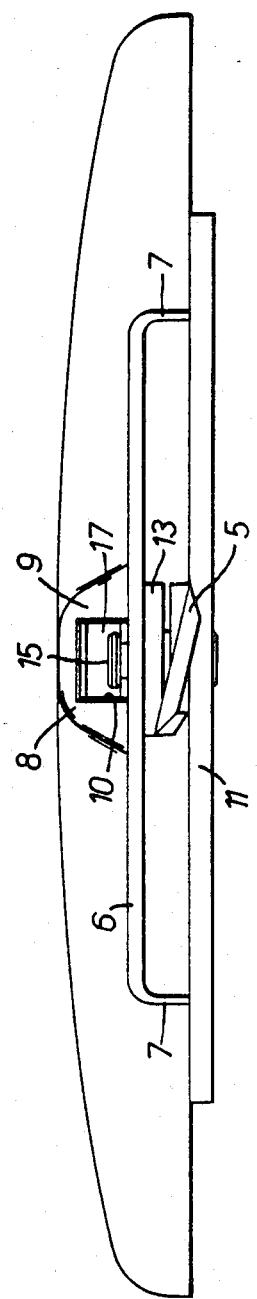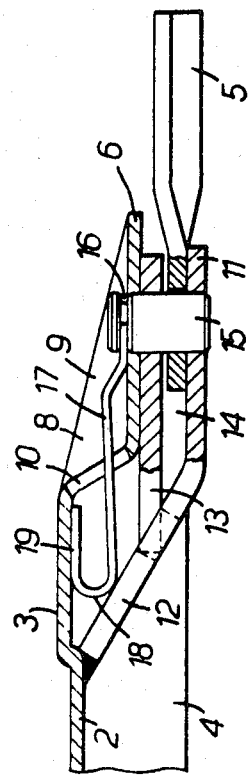

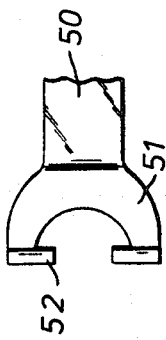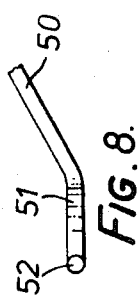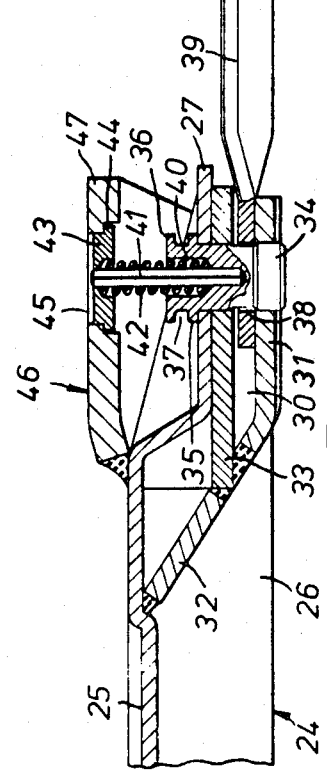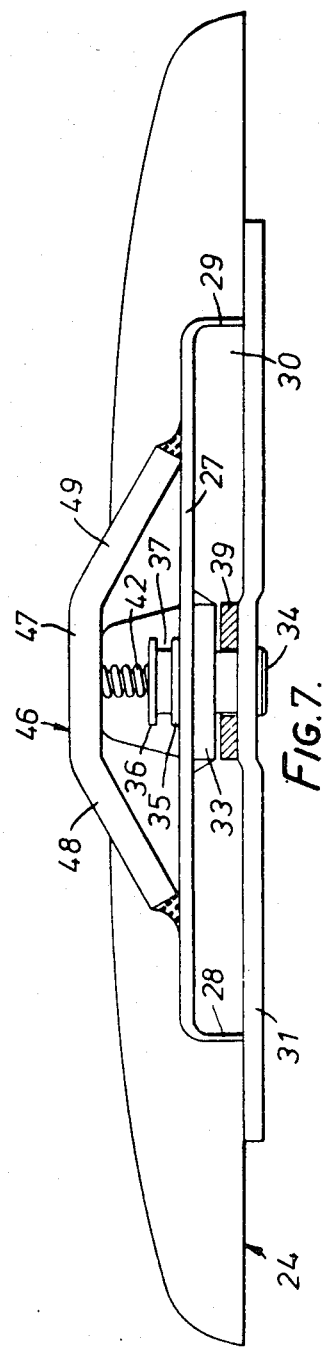

DEVICE FOR MOWING CROP

The invention relates to a device for mowing crop comprising a cutting member to be rotated about an upwardly extending rotary axis and supporting at least one upwardly extending pin located near the outer periphery of the cutting member, said pin being guarded in the cutting member with the aid of a pin-engaging end of a spring, whilst a cutting knife is freely rotatable about said pin.

In mowing devices comprising cutting members adapted to rotate about upwardly extending rotary axes it is common practice to pivotally couple the cutting knives with the aid of pins extending at least substantially parallel to the rotary axes of the cutting members. On the one hand it is then required for the cutting knives to be safely and firmly fastened so that the cutting knives cannot disengage from the cutting member in an unintentional manner, whereas on the other hand it is desirable for the cutting knives to be replaceable in a simple and ready manner. In addition the means for fastening the cutting knives to the cutting members should be as light-weight and as compact as possible. In devices such as known from British Patent Specification No. 2,001,836, German patent application No. 2,612,381 or dutch patent Application No. 7805130 it is common practice to use leaf springs, which are fastened to the cutting member with the aid of bolts. The use of bolts requires additional components and fastening the bolts requires time so that the use of such bolts for fastening a leaf spring has the effect of increasing the cost price. Moreover, after a short time the bolt will, in general, be rusted up so that the replacement of any broken leaf spring is carried out only with difficulty.

The invention has for its object to provide a device of the kind set forth in which the disadvantages inherent in the conventional constructions can be avoided.

According to the invention this can be achieved in that the end of the spring engaging the pin is slidably arranged in a recess of the pin, whereas the end of the spring remote from the pin is guarded against displacement transverse of the longitudinal axis of the pin with the aid of parts of the cutting member at least partly surrounding the end concerned of the spring and being loosely in contact with the spring.

The construction embodying the invention does not require special means for fixing the spring so that the construction can be particularly simple, in which the spring as well as the pin and the cutting knife can be readily mounted or dismounted, as the case may be.

It is a further advantage that for mounting and dismounting the cutting knife the cutting member need not be accessible from below at the area of the cutting knife. This is important, for example, in mowing devices in which on the front side screening plates are arranged below the cutting members and extend to near the front side of the cutting members. In such mowers the constructions hitherto used permit of replacing a cutting knife only when this cutting knife is located in the rear side of its circulation path. However, at this area the cutting member carrying the cutting knife is in many cases hardly accessible, particularly when the mower is combined with further tools arranged behind the cutting members. When the construction according to the invention is used, it is, however, also possible to replace the cutting knife when it is located near the front side of its circulation path.

The invention will now be described more fully with reference to a few embodiments of the construction in accordance with the invention shown in the accompanying Figures.

FIG. 1 is a plan view of a cutting member with a cutting knife forming part of the device for mowing crop, FIG. 2 is an elevational view in the direction of the arrow II in FIG. 1.

FIG. 3 a cross-sectional view of the part of FIG. 1 at the fastening area of the cutting knife.

FIG. 6 is a sectional view taken on the line VI—VI in FIG. 5.

FIG. 7 is an elevational view in the direction of the arrow VII in FIG. 5, the knife being shown in a sectional view.

FIG. 8 is a side elevation of a wrench suitable for use in replacing a knife.

FIG. 9 is a plan view of the part shown in FIG. 8.

Figure 1:
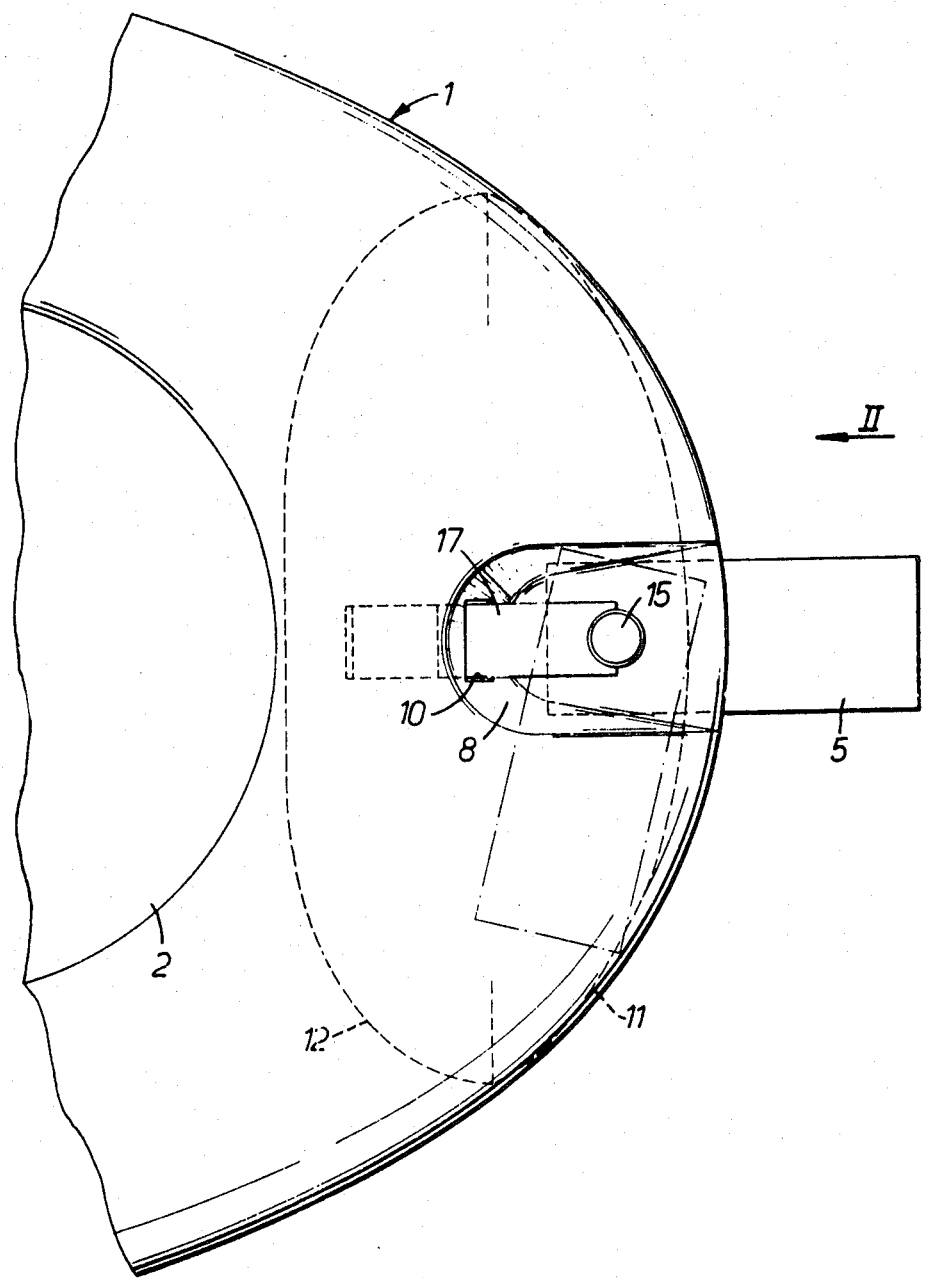

The embodiment shown of the more or less disc-shaped cutting member 1 comprises a flat, central part 2, a flat rim 3 surrounding the former and located at a slightly higher level and a more or less frustoconical part 4 adjoining the outer periphery of said rim.

At the fastening area of a cutting knife 5 the rim 3 is deformed so that the outer side of the more or less disc-shaped body is U-shaped, forming an opening bounded by a flat part 6 extending parallel to the parts 2 and 3 and by more or less vertical parts 7 extending downwards from the ends of said flat part 6. Near the centre of the part 6 the part of the body located above said part 6 has a recess 8, which is bounded by a curved, upwardly extending wall portion 9 having a hole 10.

At a given distance below the plate 6 a plate 11 extends parallel to the plate 6 and terminates at its edge remote from the circumference of the cutting member in an upwardly extending plate 12, which is integral with the plate 11 and the upper edge of which is welded near the transitional part between the parts 2 and 3.

To the plate 2 is furthermore welded the end of a strip 13, which extends outwards away from the plate 12 and is welded to the underside of the plate 6. The design is such that a given space 14 is formed between the plate 11 and the strip 13.

The plates 6, 11 and 13 have registering bores to hold a pin 15. The upper part of the pin 15 extending above the plate 6 has a continuous groove 16. This groove accommodates the end of a leaf spring 17. To this end the leaf spring 17 has a semi-circular recess at its extremity. The end of the leaf spring remote from the pin 15 is bent in the shape of a U and disposed so that the curve 18 is in engagement with the top side of the plate 12, whereas the free end 19, which is at least substantially parallel to the further part of the leaf spring, is in engagement with the underside of the plate 3.

The width of the leaf spring is at least substantially equal to the width of the opening 10, through which the leaf spring is passed.

It will be obvious that in this manner the leaf spring 17 and the pin 15 held in place by the leaf spring 17 cannot deflect from the position shown during normal operation so that the pin 15 is held in place in a simple manner by the leaf spring, which is not fastened to the disc-shaped cutting member with the aid of fastening members or the like. For replacing the knife 5 it is only necessary to pull up the pin 15 and this is allowed by the elastic leaf spring without the need for further means. When the pin is drawn up, the leaf spring can be withdrawn through the opening 10 to be free of the disc-shaped cutting member. For mounting the knife the leaf spring and the pin 15 can be put in place in the reverse order.

Since the pin 15 and the leaf spring 17 can be exchanged on the top side of the disc-shaped cutting member, the replacement of the cutting knife 5 will not be hindered by frame parts located, as the case may be, below the cutting member. Moreover, both the leaf spring and the pin are in satisfactorily protected positions so that undesirable damage of these parts is practically excluded. When the knife is turned, it cannot come into contact with the spring, which also contributes to avoiding damage of the spring.

Figure 4:
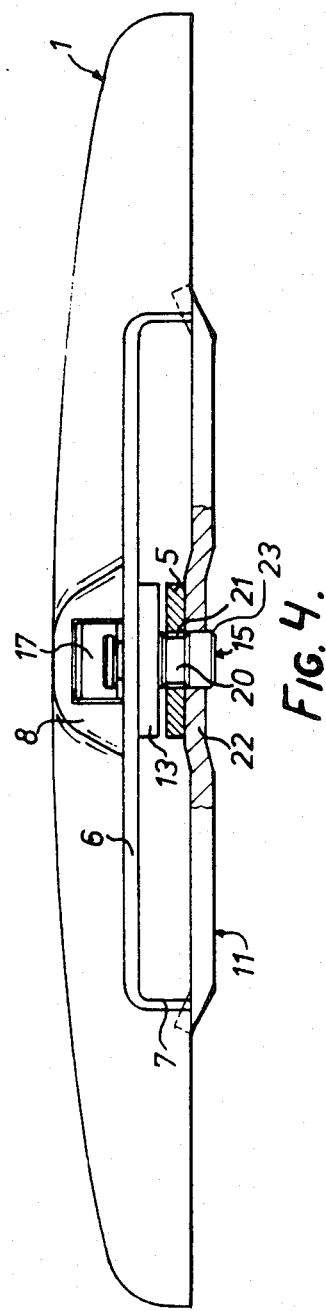
FIG. 4 is partly an elevational view and partly a sectional view corresponding to FIG. 2 of a modified embodiment.

FIG. 4 shows a slightly modified embodiment. Parts shown in FIG. 4 corresponding with the parts discussed above and illustrated in FIGS. 1 to 3 are designated by the same reference numerals as in FIGS. 1 to 3. From FIG. 4 it will be apparent that the part 20 of the pin 15 located in the hole 21 in the knife 5 is thinner than the parts of the pin 15 located on both sides thereof. During operation a part of the pin 15 will be in contact with the part of the knife 5 bounding the hole 21 so that a guard member is formed, preventing axial displacement of the pin.

In this embodiment the central part 22 of the plate 11, which supports the lower end of the pin 15, is pressed upwardly. Therefore, the lower end of the pin having a localising rim 23 can protrude below the depressed part of the plate 11, whereas this lower end is yet located at a higher level than the parts of the plate 11 located on both sides thereof. Consequently, easy mounting of the pin is ensured, whilst the end of the pin protruding below the plate 11 is protected by the parts located on both sides thereof against contact with the ground or objects lying on the ground so that damage of said lower end is avoided.

Figure 5:
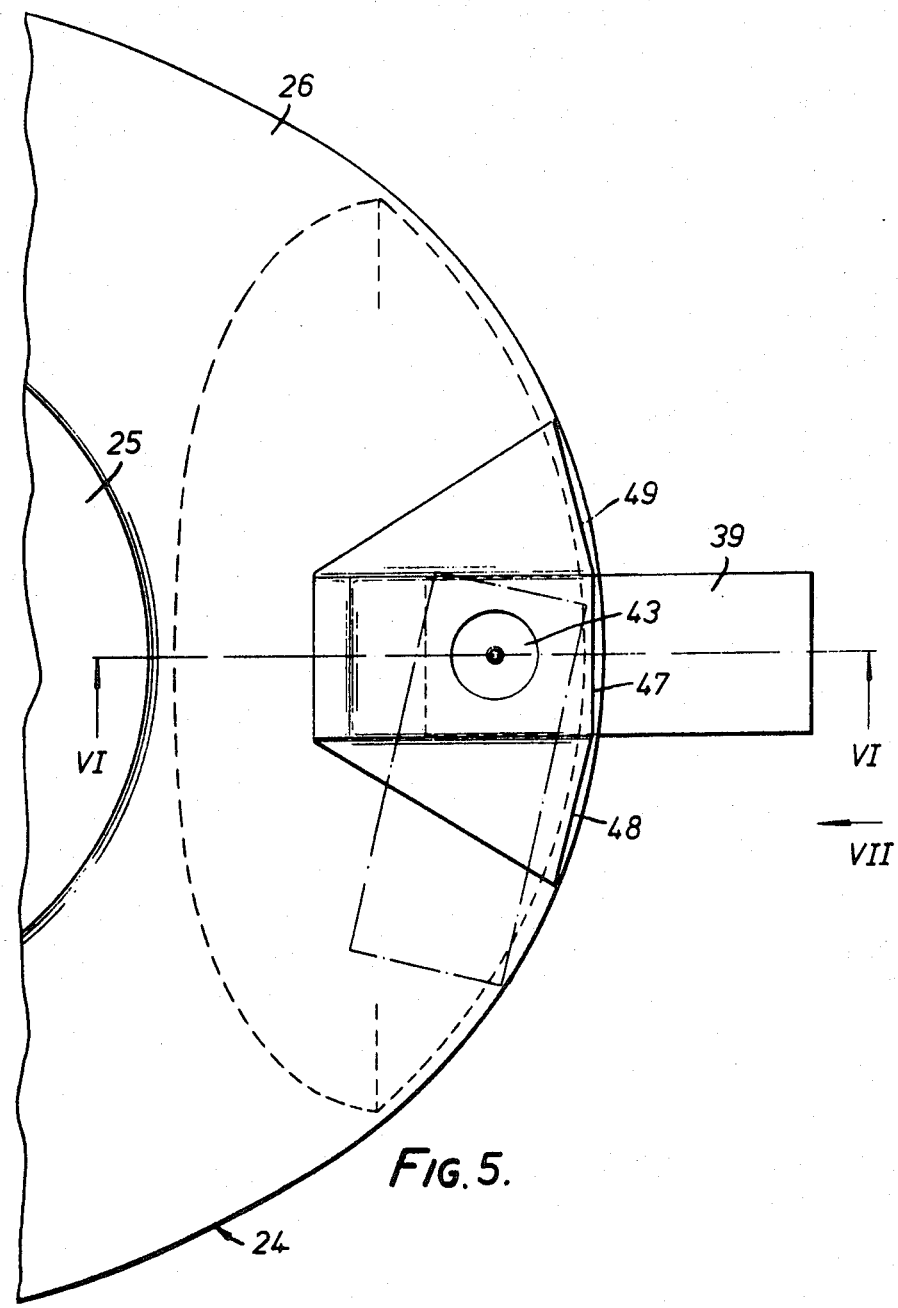
FIG. 5 is a plan view of part of a cutting member with which is coupled a knife with the aid of the cutter fastening mode in a third embodiment of the invention.

In the embodiment shown in FIG. 5 the cutting member, which is only partly shown, comprises a dish-shaped member 24 having an at least substantially horizontal central part 25 and a more or less frustoconical peripheral rim 26. The dish-shaped member is frequently oval or more or less elliptical. At two diametrically opposite spots of the cutting member 24 the dish-shaped member is depressed so that a horizontal boundary wall 27 is formed near the outer circumference, said wall having at its ends limbs 28 and 29 extending downwards to the lower boundary face of the disc 24. The space 30 bounded by said parts 27 to 29 of the dish-shaped member 24 is defined on the underside by a horizontal part 31 of a plate-shaped member welded to the dish-shaped member and having an upwardly inclined part 32 adjoining the inner edge of the part 31. To the underside of the part 27 of the dish-shaped member is furthermore welded a strip 33 extending at least substantially in a radial direction with respect to the rotary axis of the dish-shaped member, the inner end of said strip being also welded to the plate-shaped member 32.

The wall 27, the strip 33 and the plate-shaped part 31 have registering holes for passing a pin 34. The pin 34 has a protruding collar 35, which bears on the top face of the wall portion 27 and furthermore a collar 36 located at a given distance above the collar 35 so that the two collars 35 and 36 define a continuous groove 37.

The diameter of that part of the pin 34 which is located at the level of the space 30 between the underside of the strip 33 and the top side of the plate-shaped part 31 is smaller than that of the further part of the pin 34 and this thinner part of the pin 34 is located in a bore 38 in one end of a cutting knife 39 so that this cutting knife 39 is freely pivotable about the pin 34. In normal operation the cutting knife will be in the position indicated by solid lines in the Figures, but under the action of forces exerted thereon the cutting knife may turn back into the space 30 as is indicated by broken lines in FIG. 5.

From FIG. 6 it will furthermore be apparent that the pin 34 has a stepped, blind bore 40. Into the lower part of the blind bore 40 having the smaller diameter is pressed the end of an upwardly extending pin 41. This pin 41 is surrounded by a helical compression spring 42, the lower part of which is received in the upper part of the blind bore 40. The top end of the compression spring 42 bears on a cup 43 having a protruding collar 44.

The cup 43 is arranged in a stepped hole 45 in a screening hood 46 fastened to the dish-shaped member. Since the bore 45 is stepped, a shoulder is formed for supporting the collar 44 so that an upward movement of the cup 43 under the action of the force of the spring 42 out of the position shown in FIG. 6 is prevented.

From FIG. 7 it will be, in particular, apparent that the hood-shaped member 46 comprises a horizontal part 47 extending above the pin 34 and two downwardly extending parts 48 and 49 adjoining the boundary edges of said part 47 and having their lower edges welded to the top side of the plate-shaped part 27. From FIG. 5 it will be seen that these parts 48 and 49 extend away from the boundary edges of the part 47 in the direction of rotation and opposite said direction respectively; their shape is more or less triangular so that away from the basis located near the outer circumference of the dish-shaped member they are gradually tapering into a tip.

It will be obvious that under the action of the force of the spring 42 the pin 34 will be held in the position shown in FIG. 6 so that an undesirable upward movement of the pin 34 and hence an unintentional disengagement of the cutting knife 39 are avoided. Thereto is contributing the fact that the knife 39 is rotatable about a part of the pin 34 which is thinner than the further parts of the pin 34 so that the part of the cutting knife engaging the pin 34 by the action of centrifugal force during operation serves in addition as a kind of stop which counteracts an upward movement of the knife.

The screening hood 46 provides a satisfactory protection of the pin 34 and of the means retaining the pin 34, so that undesirable damage of said means is avoided, and, in addition, it is an effective expedient for the displacement of the mown crop with the aid of the rotating cutting member. Such protruding parts are frequently required to ensure effective displacement of the crop, whilst in the construction according to the present invention they are effectively employed as a screening member and a support for the knife connection.

For a replacement of a cutting knife the wrench shown in FIGS. 8 and 9 can be used; it is provided with a handle 50 shown only partly a more or less U-shaped bracket 51 being fastened to one end of said handle. Pins 52 are secured to the ends of the limbs of the bracket 51. It will be obvious that the pins 52 can be slipped into the continuous groove 37, whilst the bracket 51 will bear at least partly on the top face of the plate-shaped part 27. When subsequently a downwardly directed force is exerted on the handle 50, the pin 34 will be urged upwards against the force of the spring 42 into a position in which the cutting knife 39 is free from the lower end of the pin 34 and in which the cutting knife concerned can be removed to be replaced by a new one.

Figure 10:
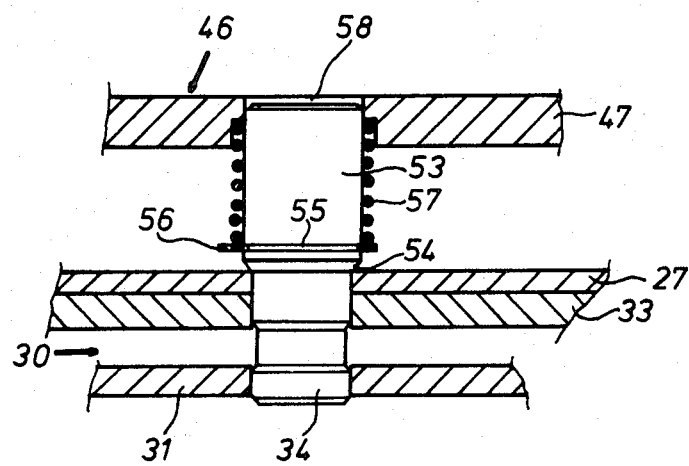
FIG. 10 shows a fourth embodiment of the construction in accordance with the invention.

FIG. 10 shows part of a further embodiment of the construction, partly in a sectional view and partly in an elevational view.

The parts corresponding with those described with reference to the preceding Figures are designated in FIG. 10 by the same reference numerals as in the preceding FIGS. 5 to 7. For the sake of clarity the knife is not shown in FIG. 10.

In this embodiment the pin 34 is provided at its top end with a prolongation 53, which is integral with said pin and which has a larger diameter than the adjacent part of the pin 34 so that at the level of the junction between the parts 34 and 53 a shoulder is formed which in the position shown is in engagement with the top side of the boundary wall 27 so that a downward movement of the pin 34 out of the position shown in FIG. 10 is prevented.

Near its lower end the part 53 has a continuous groove 55 holding a guard ring 56. The guard ring 56 supports the lower end of a helical spring 57 surrounding the prolongation 53.

FIG. 10 furthermore shows that the top end of the pin 53 and the top end of the helical spring 57 are accommodated in a stepped bore 58 in the horizontal part 47 of the screening hood 46.

It will be obvious that also in this embodiment the disposition is such that the helical spring tends to retain the pin 34 in the position shown in the Figure, whilst the pin 34 can be readily moved upwards against the pressure of the spring 57 for mounting or removing a cutting knife, as the case may be. The upward movement of the pin 34 may be carried out with the aid of an appropriate tool such as a screw driver, by means of which an upwardly directed force can be exerted on the bottom face of the ring 56. The design illustrated in FIG. 10 provides a very reliable and simple construction requiring particularly few components.

The construction embodying the invention permits of fastening a cutting knife in a simple manner needing only little space and being at the same time particularly reliable and allowing ready replacement of the cutting knives.

As a matter of course, modifications of the embodiments depicted above and illustrated in the accompanying Figures may be applied within the spirit and scope of the invention. For example, cup springs may be used rather than the helical spring 42 or 57 shown.

I claim:

1. A device for mowing crops and having a substantially dish-shaped cutting member having a rim portion and rotatable around a vertical axis, said cutting member comprising a plurality of pivot pins carried thereon and extending substantially parallel to said vertical axis of rotation, a cutting knife pivotably mounted on each of said pivot pins, a protective hood mounted on an upper surface of the rim portion of said cutting member over each said pivot pin and having a radially extending central portion and two adjoining tangentially disposed downwardly inclined portions, a coil compression spring on each said pivot pin having one end exerting a downward force on said pivot pin and having another end exerting a force on the underside of the central portion of said respective protective hood, each said protective hood having at least a portion thereof spaced above said cutting knife pivot pin to define a space to accommodate said spring, each said space being open in a radial direction at the outer circumference of said cutting member to provide access to the pivot pin to enable the pin to be moved against said spring so that the cutting knife can be removed.

2. A device as claimed in claim 1 wherein the downwardly inclined parts adjoining the central part of the hood have a width gradually decreasing from the outer circumference in the direction towards the rotary axis.

3. A device as claimed in claim 1 characterized in that the underside of said hood has a recess in which said other end of the spring is located.

4. A device as claimed in claim 3 characterized in that the other end of said spring is in contact with a cup arranged in the recess.

5. A device as claimed in claim 1 characterized in that the pin is provided with a protruding collar or shoulder bearing on a part of the cutting member.

6. A device as claimed in claim 5 characterized in that a given distance above said collar a second collar is provided so that the two collars define a continuous groove.

7. A device as claimed in claim 1 characterized in that the pin is provided with a prolongation being integral with the pin and located above said pin and being surrounded by the compression spring.

8. A device as claimed in claim 7 characterized in that one end of the spring bears on a resilient guard ring arranged in a groove provided in said prolongation.

9. A device as claimed in claim 1 characterized in that in the pivot pin is fastened the end of an upwardly extending pin surrounded by the coil compression spring.

10. A device as claimed in claim 9 characterized in that the lower end of the coil compression spring is located in a bore in the upper end of the pivot pin.

11. A device as claimed in claim 1 characterized in that the cutting knife is rotatable about a portion of the pivot pin which is located between two at least substantially parallel plates arranged below the spring and forming part of the cutting member.

12. A device as claimed in claim 1 characterized in that a portion of the pivot pin located in a hole in the cutting knife is thinner than at least one adjoining part of the pivot pin.

13. A device as claimed in claim 1 characterized in that the lower end of the pivot pin is located in a supporting part which is disposed at a higher level than parts of the cutting member located on both sides of said supporting part.

14. A device as claimed in claim 13 characterized in that the supporting part is defined by an upwardly bent-out part of a plate supporting the lower end of the pivot pin.

* * * * *